(12) United States Patent
Kediya et al.

(10) Patent No.: US 12,073,840 B2
(45) Date of Patent: *Aug. 27, 2024

(54) DEVICE FINDER USING VOICE AUTHENTICATION

(71) Applicant: QUALCOMM Incorporated, San Diego, CA (US)

(72) Inventors: Alok Kediya, Hyderabad (IN); Manish Poddar, Burhanpur (IN); Mukund Mittal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,413

(22) Filed: Aug. 18, 2023

(65) Prior Publication Data

US 2023/0395077 A1    Dec. 7, 2023

Related U.S. Application Data

(63) Continuation of application No. 17/226,724, filed on Apr. 9, 2021, now Pat. No. 11,749,287.

(51) Int. Cl.
*G10L 17/24* (2013.01)
*G06F 3/16* (2006.01)
(Continued)

(52) U.S. Cl.
CPC .............. *G10L 17/24* (2013.01); *G06F 3/165* (2013.01); *G08B 3/00* (2013.01); *G08B 21/24* (2013.01);
(Continued)

(58) Field of Classification Search
CPC ......... G10L 17/24; G10L 17/02; G10L 17/04; G10L 17/06; G06F 3/165; G08B 3/00; G08B 21/24
(Continued)

(56) References Cited

U.S. PATENT DOCUMENTS 8,467,770 B1 * 6/2013 Ben Ayed ............... G06F 21/35
455/411
9,418,664 B2    8/2016 Addy et al.
(Continued)

OTHER PUBLICATIONS

International Search Report and Written Opinion—PCT/US2022/019568—ISA/EPO—Jun. 15, 2022.
(Continued)

*Primary Examiner* — Edwin S Leland, III
(74) *Attorney, Agent, or Firm* — QUALCOMM Incorporated; Espartaco Diaz Hidalgo

(57) ABSTRACT

A computing device may receive an indication of an audio signal captured by a microphone, wherein the audio signal includes voice input. The computing device may determine that the voice input in the audio signal is from an authorized user of the computing device and includes a trigger phrase associated with a request to trigger device finder functionality based at least in part on comparing the voice input with data provided by the authorized user of the computing device. The computing device may, in response to determining that the voice input in the audio signal is from the authorized user of the computing device and includes the trigger phrase associated with the request to trigger device finder functionality, cause a speaker of the computing device to audibly output the alert sound to assist the authorized user to locate the computing device.

44 Claims, 5 Drawing Sheets

(51) Int. Cl.
  *G08B 3/00* (2006.01)
  *G08B 21/24* (2006.01)
  *G10L 17/02* (2013.01)
  *G10L 17/04* (2013.01)
  *G10L 17/06* (2013.01)

(52) U.S. Cl.
  CPC .............. *G10L 17/02* (2013.01); *G10L 17/04* (2013.01); *G10L 17/06* (2013.01)

(58) Field of Classification Search
  USPC .......................................................... 704/246
  See application file for complete search history.

(56) References Cited

U.S. PATENT DOCUMENTS

| | | | |
|---|---|---|---|
| 9,786,145 B2 | 10/2017 | Oppenheimer | |
| 9,946,862 B2 | 4/2018 | Yun et al. | |
| 11,450,196 B2* | 9/2022 | Daoura | H04W 52/028 |
| 11,749,287 B2 | 9/2023 | Kediya et al. | |
| 2014/0128032 A1* | 5/2014 | Muthukumar | H04W 52/0254 |
| | | | 455/412.2 |
| 2016/0044151 A1* | 2/2016 | Shoemaker | H04M 19/02 |
| | | | 455/556.1 |
| 2017/0154176 A1* | 6/2017 | Yun | H04M 1/67 |
| 2018/0338032 A1* | 11/2018 | Baek | H04W 88/02 |
| 2019/0245503 A1* | 8/2019 | Wardle | H04S 7/301 |
| 2020/0075036 A1* | 3/2020 | Shin | G10L 25/78 |
| 2020/0380980 A1* | 12/2020 | Shum | G10L 15/18 |
| 2021/0082405 A1 | 3/2021 | Liu et al. | |
| 2021/0256833 A1* | 8/2021 | Daoura | H04W 4/021 |
| 2022/0328049 A1* | 10/2022 | Kediya | G10L 17/02 |
| 2023/0051613 A1* | 2/2023 | Bhowmik | G01S 13/765 |
| 2023/0099728 A1* | 3/2023 | Wang | G08B 21/24 |
| | | | 381/315 |
| 2023/0395077 A1* | 12/2023 | Kediya | G10L 17/24 |

OTHER PUBLICATIONS

Vasuki P., et al., "Speech Based Object Tracking System", 2020 4th International Conference on Computer, Communication and Signal Processing (ICCCSP), IEEE, Sep. 28, 2020 (Sep. 28, 2020), pp. 1-6.

* cited by examiner

DEVICE FINDER USING VOICE AUTHENTICATION

This application is a continuation of U.S. patent application Ser. No. 17/226,724, filed 9 Apr. 2021, the entire contents of which is incorporated herein by reference.

TECHNICAL FIELD

This disclosure relates to mobile computing devices.

BACKGROUND

A mobile computing device may have a device finder feature that helps a user of the mobile computing device to find the device when the device is misplaced. When the user uses the device finder feature, the mobile computing device outputs audio that may help the user locate the device. In some examples, to use the device finder feature, the user of the mobile computing device may log onto an online service associated with the mobile computing device. Once the user has logged into the online service, the user may activate the device finder feature using the online service, and the online service may communicate with the mobile computing device over the Internet to cause the mobile computing device to output the audio and thereby help the user locate the device.

SUMMARY

In general, this disclosure describes techniques that enable a mobile computing device to provide a device finder feature that helps a user of the device to find the device in ways that are more secure and more user friendly without requiring the mobile computing device to be connected to a network, such as the Internet, or to be connected, such as via Bluetooth, with other network devices. Instead, the mobile computing device may listen for an authorized user of the mobile computing device to say a trigger phrase in order to trigger the device finder feature of the mobile computing device.

When the mobile computing device detects voice input in the audio signal captured by a microphone of the mobile computing device, the mobile computing device may perform voice authentication to determine whether the voice input is the trigger phrase being said by the authorized user of the mobile computing device. If the mobile computing device determines that the voice input is the trigger phrase being said by the authorized user of the mobile computing device, the mobile computing device may trigger its device finding functionality by audibly outputting an alert sound, thereby assisting the authorized user of the mobile computing device to locate the mobile computing device.

In one example, a method includes receiving, by one or more processors of a computing device, an indication of an audio signal captured by a microphone, wherein the audio signal includes voice input, determining, by the one or more processors, that the voice input in the audio signal is from an authorized user of the computing device and includes a trigger phrase associated with a request to trigger device finder functionality based at least in part on comparing the voice input with data provided by the authorized user of the computing device, and in response to determining that the voice input in the audio signal is from the authorized user of the computing device and includes the trigger phrase associated with the request to trigger device finder functionality, causing, by the one or more processors, a speaker of the computing device to audibly output the alert sound to assist the authorized user to locate the computing device.

In another example, a computing device includes a memory configured to store data provided by an authorized user of the computing device; a microphone configured to capture an audio signal; a speaker; and processing circuitry configured to: receive an indication of the audio signal captured by the microphone, wherein the audio signal includes voice input; determine that the voice input in the audio signal is from the authorized user of the computing device and includes a trigger phrase associated with a request to trigger device finder functionality based at least in part on comparing the voice input with the data; and in response to determining that the voice input in the audio signal is from the authorized user of the computing device and includes the trigger phrase associated with the request to trigger device finder functionality, cause the speaker to audibly output the alert sound to assist the authorized user to locate the computing device.

In another example, a computing device includes means for receiving an indication of an audio signal captured by a microphone, wherein the audio signal includes voice input; means for determining that the voice input in the audio signal is from an authorized user of the computing device and includes a trigger phrase associated with a request to trigger device finder functionality based at least in part on comparing the voice input with data provided by the authorized user of the computing device; and means for, in response to determining that the voice input in the audio signal is from the authorized user of the computing device and includes the trigger phrase associated with the request to trigger device finder functionality, causing a speaker of the computing device to audibly output the alert sound to assist the authorized user to locate the computing device.

In another example, a computer-readable storage medium is encoded with instructions that, when executed, cause one or more processors of a computing device to receive an indication of an audio signal captured by a microphone, wherein the audio signal includes voice input; determine that the voice input in the audio signal is from an authorized user of the computing device and includes a trigger phrase associated with a request to trigger device finder functionality based at least in part on comparing the voice input with data provided by the authorized user of the computing device; and in response to determining that the voice input in the audio signal is from the authorized user of the computing device and includes the trigger phrase associated with the request to trigger device finder functionality, cause a speaker of the computing device to audibly output the alert sound to assist the authorized user to locate the computing device.

The details of one or more examples are set forth in the accompanying drawings and the description below. Other features, objects, and advantages will be apparent from the description, drawings, and claims.

DETAILED DESCRIPTION

Figure 1:
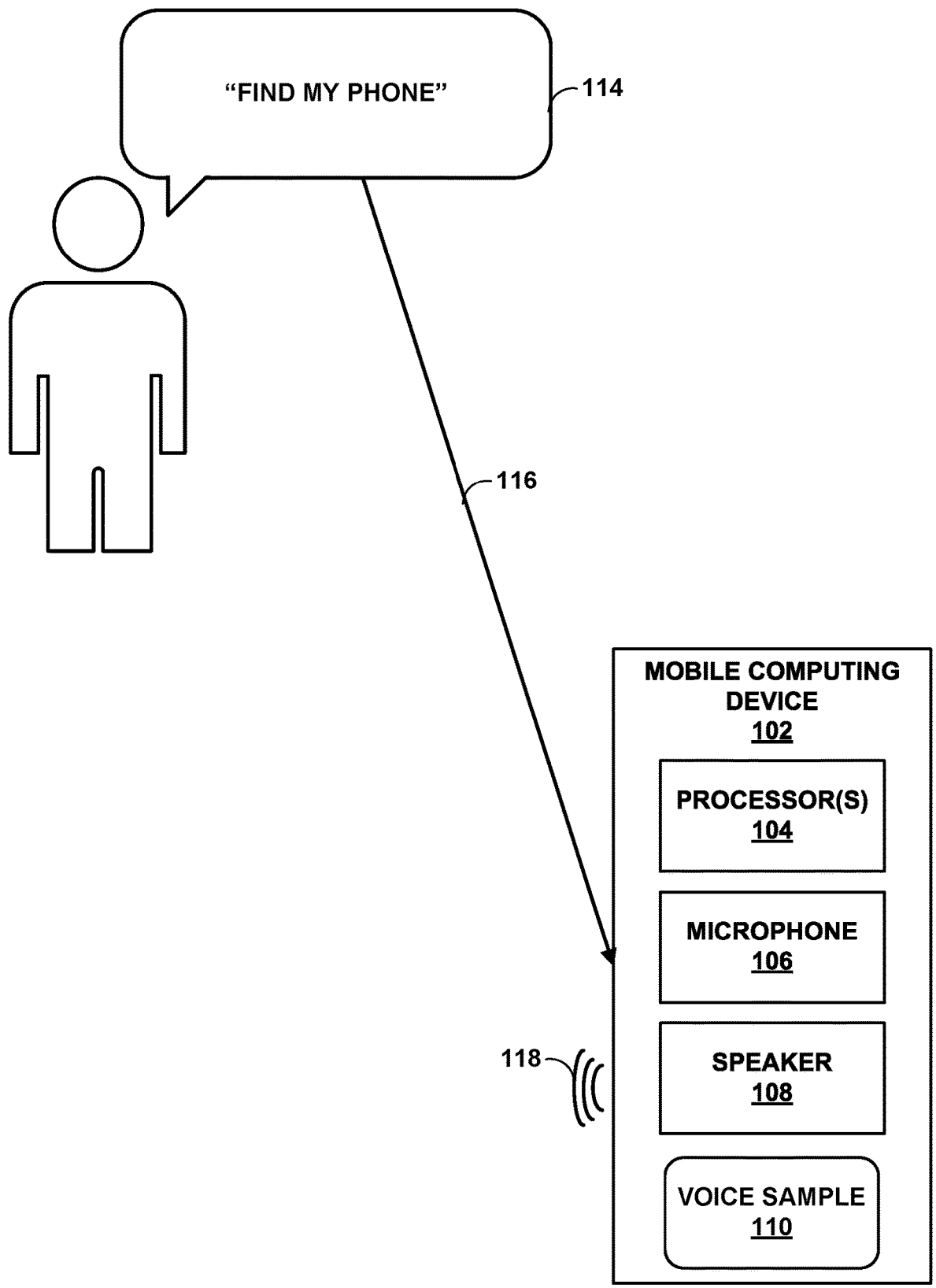
FIG. 1 is a block diagram illustrating an example environment including an example computing device that implements a device finder feature using voice authentication, in accordance with the techniques of this disclosure.

FIG. 1 is a block diagram illustrating an example environment including an example computing device that implements a device finder feature using voice authentication, in accordance with the techniques of this disclosure. As shown in FIG. 1, computing device 102 may be a mobile computing device, such as a mobile phone (including a smart phone), a laptop computer, a tablet computer, a wearable computing device (e.g., so-called "smartwatches," "smart glasses," and/or wireless headsets, including "smart headsets," wireless earbuds—and accompanying cases, etc.), a personal digital assistant (PDA), a smart speaker, or any other computing device suitable for implementing a device finder feature using voice authentication. Computing device 102 includes one or more processors 104 that implements functionality and/or execute instructions within computing device 102. Examples of one or more processors 104 may include one or more digital signal processors (DSPs), general purpose microprocessors such as central processing units (CPUs), graphics processors such as graphics processing units (GPUs), co-processors, or any other suitable processing circuitry.

Computing device 102 may also include microphone 106 and speaker 108. Microphone 106 may be any suitable device for capturing audio signals from a surrounding environment of computing device 102, such as an analog microphone, a digital microphone, or any other suitable audio capture device. Speaker 108 may be any suitable device for outputting audio, such as any audio output device that produces sound in response to an electrical audio signal input. Microphone 106 and speaker 108 may each, in other words, represent a transducer capable of capturing audio and/or emitting audio.

Computing device 102 may implement a device finding feature that assists the user of computing device 102 with finding where computing device 102 is physically located by emitting a sound that may be audible to the user. Specifically, computing device 102 may receive a request to trigger device finder functionality and may, in response, emit a sound via speaker 108. By emitting a sound in response to receiving a request to trigger device finder functionality, computing device 102 thereby allowing the user of computing device 102 to use the sound emitted by computing device 102 to physically locate computing device 102 (e.g., when the user misplaces or loses computing device 102).

In some examples, computing device 102 may receive the request to trigger device finder functionality from another computing device via a network, such as over the Internet or via Bluetooth. Computing device 102 may, in response to receiving the request to trigger device finder functionality, emit a sound via speaker 108. However, if computing device 102 is unable to connected to the Internet or is otherwise unable to establish a personal area network (PAN, where Bluetooth® is one such example) connection with another computing device that is connected to the Internet, then computing device 102 may be unable to receive any requests to trigger device finder functionality.

In accordance with aspects of this disclosure, computing device 102 may accept requests to trigger device finder functionality via voice input from an authorized user of computing device 102. If computing device 102 determines that voice input received by computing device 102 via microphone 106 is from an authorized user of computing device 102 and contains a specified phrase associated with a request to trigger device finder functionality, computing device 102 may, in response, emit the sound via speaker 108 (possibly without requiring any access to the Internet, either directly or indirectly via the PAN connection).

By being able to receive requests to identify itself in the form of voice input, computing device 102 may receive requests to identify itself without having to establish any network connections. That is, computing device 102 may be able to receive requests to identify itself via microphone 106 instead of wireless network connections such as Wi-Fi or Bluetooth, and computing device 102 may be able to determine, on-device, whether the voice input received by computing device 102 is from an authorized user and contains a specified phrase without sending the voice input off-device (e.g., to the cloud). Furthermore, by determining whether voice input received by computing device 102 contains a specified phrase associated with a request to trigger device finder functionality and is from an authorized user, computing device 102 improves the security of the device finder feature.

Because the specified phrase associated with a request to trigger device finder functionality may only be known to an authorized user of computing device 102, it may be unlikely that anyone other than an authorized user of computing device 102 would have knowledge of the specified phrase associated with a request to trigger device finder functionality. Furthermore, even if an unauthorized user gains knowledge of the specified phrase associated with a request to trigger device finder functionality, computing device 102 may be able to determine whether the voice input is from an authorized user, and may refrain from emitting a sound if the voice input is not from an authorized user, thereby providing an additional layer of security to the device finder feature.

Specifically, microphone 106 of computing device 102 may capture audio signals 116 from the surrounding environment of computing device 102, and one or more processors 104 of computing device 102 may determine whether the audio signals 116 captured by microphone 106 includes voice input 114 that is from an authorized user of computing device 102 and contains a specified phrase associated with a request to trigger device finder functionality. To determine whether the voice input 114 is from an authorized user of computing device 102 and contains a specified phrase associated with a request to trigger device finder functionality, one or more processors 104 may compare the received voice input 114 with data provided by the authorized user of computing device 102.

In some examples, the data previously provided by the authorized user of computing device 102 may be in the form of voice sample 110. Voice sample 110 is an audio file containing audio of the authorized user speaking the specified phrase associated with a request to trigger device finder functionality. For example, voice sample 110 may contain audio of the authorized user saying a phrase such as "find my phone." One or more processors 104 may determine whether voice input 114 is both from an authorized user of computing device 102 and contains a specified phrase associated with a request to trigger device finder functionality by comparing voice input 114 with voice sample 110. For example, one or more processors 104 may extract a set of features from voice input 114 and compare the set of features extracted from voice input 114 to a set of features extracted from voice sample 110. If one or more processors 104 determines that the set of features extracted from voice input 114 matches the features extracted from voice sample 110, one or more processors 104 may determine that voice input 114 is both from an authorized user of computing device 102 and contains a specified phrase associated with a request to trigger device finder functionality. One or more processors 104 of computing device 102 may, in response to determining that voice input 114 is both from an authorized user of computing device 102 and contains a specified phrase associated with a request to trigger device finder functionality, cause speaker 108 to emit sound 118, thereby allowing an authorized user of computing device 102 to use sound 118 emitted by computing device 102 to physically locate computing device 102.

Figure 2:
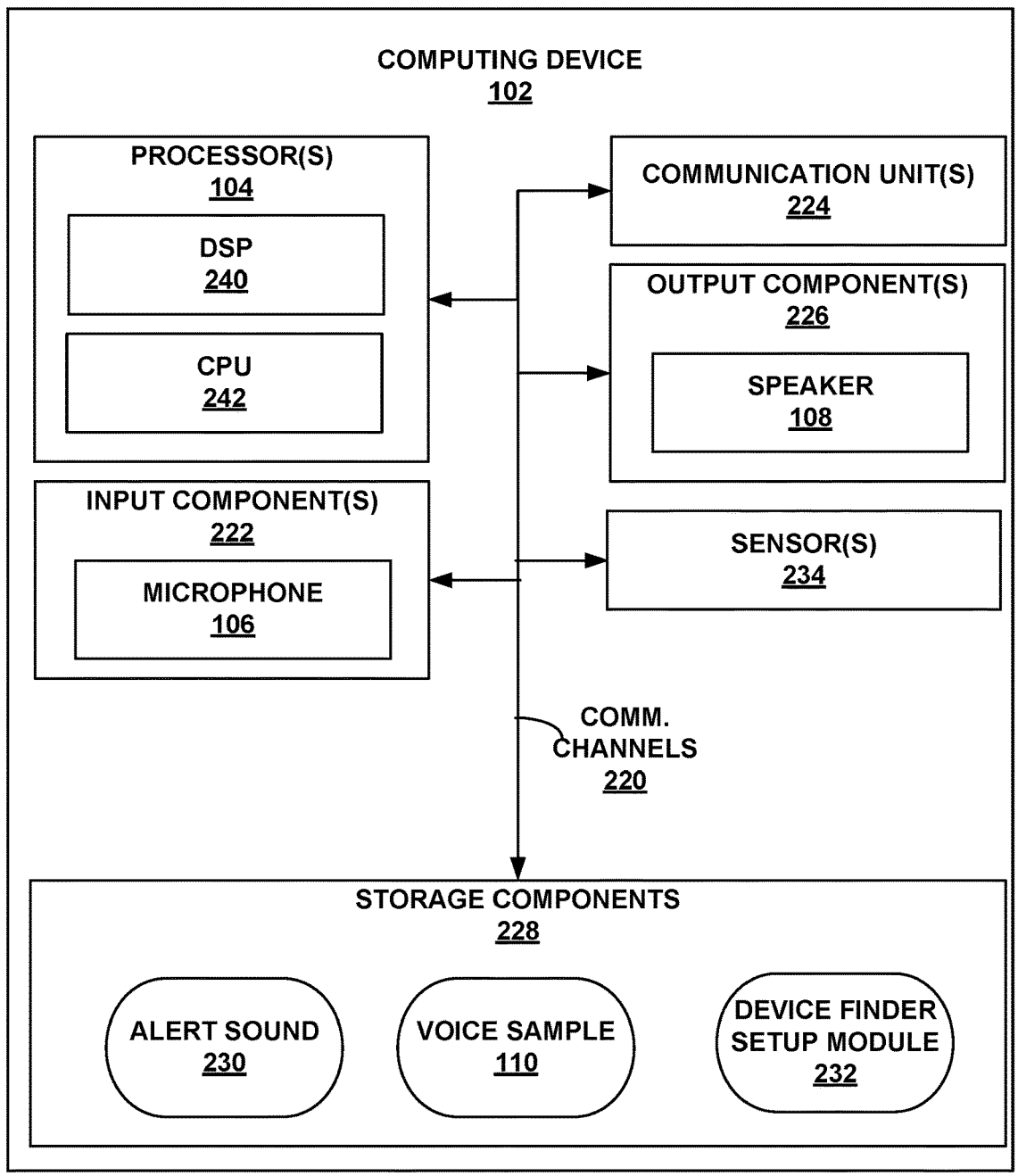
FIG. 2 is a block diagram illustrating the example computing device of FIG. 1 in further detail, in accordance with aspects of this disclosure.

FIG. 2 is a block diagram illustrating the example computing device 102 of FIG. 1 in further detail, in accordance with aspects of this disclosure. As shown in the example of FIG. 2, computing device 102 includes one or more processors 104, one or more input components 222, one or more communication units 224, one or more output components 226, one or more storage components 228, and one or more sensors 234. One or more processors 104 may include central processing unit (CPU) 242 and processor 240. One or more input components 222 may include microphone 106. One or more output components 226 may include speaker 108. One or more storage components 228 of computing device 102 include device finder setup module 232, voice sample 110, and alert sound 230.

Communication channels 220 may interconnect each of one or more processors 104, one or more input components 222, one or more communication units 224, one or more output components 226, one or more storage components 228, and one or more sensors 234 for inter-component communications (physically, communicatively, and/or operatively). In some examples, communication channels 220 may include a system bus, a network connection, an inter-process communication data structure, or any other method for communicating data.

One or more input components 222 of computing device 102 may receive input. Examples of input are tactile, audio, and video input. For example, one or more input components 222 may include microphone 106 for capturing audio signals from a surrounding environment of computing device 102. In some examples, one or more input components 222 may also include a presence-sensitive display, a touch-sensitive screen, mouse, a keyboard, a video camera, or any other type of device for detecting input from a human or machine.

One or more output components 226 of computing device 102 may include any hardware component for generating output. Examples of output include tactile, audio, and video output. One or more output components 226 of computing device 102, in one example, includes speaker 108, a presence-sensitive display, a sound card, a video graphics adapter card, speaker, a display device, or any other type of device for generating output to a human or machine.

One or more communication units 224 of computing device 102 may communicate with external devices via one or more wired and/or wireless networks by transmitting and/or receiving network signals on the one or more networks. Examples of one or more communication units 224 include a network interface card (e.g. such as an Ethernet card), an optical transceiver, a radio frequency transceiver, a GPS receiver, or any other type of device that can send and/or receive information. Other examples of communication units 244 may include short wave radios, cellular data radios, wireless network radios, as well as universal serial bus (USB) controllers.

One or more sensors 234 may include any input or sensor component configured to obtain environmental information about the circumstances surrounding computing device 102 and/or physiological information that defines the activity state and/or physical well-being of a user of computing device 102. In some examples, a sensor component may be an input component that obtains physical position, movement, and/or location information of computing device 102. For instance, one or more sensors 234 may include one or more location sensors (GPS components, Wi-Fi components, cellular components), one or more motion sensors (e.g., multi-axial accelerometers, gyros), one or more pressure sensors (e.g., barometer), one or more ambient light sensors, and one or more other sensors (e.g., infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more processors 104 may implement functionality and/or execute instructions within computing device 102. One or more processors 104 may include CPU 242. CPU 242 may be a microprocessor, such as a general purpose processor or a special purpose processor, for processing instructions of a computer program for execution. One or more processors 104 may also include processor 240. Processor 240 may be a co-processor, a DSP, a processing block of CPU 242, and the like.

Processor 240 may be a microprocessor optimized for audio signal processing and may include any suitable digital signal processor capable of performing audio signal processing. In some examples, by being optimized for audio signal processing compared with CPU 242, processor 240 may be able to consume less power when performing audio signal processing compared with CPU 242. In other examples, one or more processors 104 may include a graphics processing unit (GPU), application processors, display controllers, sensor hubs, and any other hardware configured to function as a processing unit, such as application specific integrated circuits (ASICs), field programmable gate arrays (FPGAs), or other equivalent integrated or discrete logic circuitry.

One or more storage components 228 within computing device 102 may store information for processing during operation of computing device 102. In some examples, storage component 228 is a temporary memory, meaning that a primary purpose of storage component 228 is not long-term storage. Storage components 228 on computing device 102 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

One or more storage components 228, in some examples, also include one or more computer-readable storage media. One or more storage components 228 may be configured to store larger amounts of information than volatile memory. One or more storage components 228 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 228 may store program instructions and/or information (e.g., data) associated with device finder setup module 232 as well as voice sample 110 and alert sound 230.

One or more processors 104 of computing device 102 are configured to perform device finder functionality using voice authentication. To set up and configure the device finder functionality of computing device 102, one or more processors 104 may execute device finder setup module 232. When device finder setup module 232 executes at one or more processors 104 to perform the set up and configuration process for the device finder functionality, device finder setup module 232 may enable an authorized user of computing device 102 to specify a phrase associated with a request to trigger device finder functionality. Such a phrase may be referred to throughout this disclosure as a trigger phrase.

An authorized user of computing device 102 may specify the trigger phrase associated with a request to trigger device finder functionality as any combination of two or more words in any spoken language such as English, Spanish, Russian, Japanese, etc. That is, the authorized user is not limited to selecting from a list of one or more pre-determined phrases as the trigger phrase associated with a request to trigger device finder functionality. Further, the trigger phrase specified by the user is not required by computing device 102 to include any predetermined keywords. That is, the trigger phrase may not be required by computing device 102 to include pre-selected keywords such as "hey," "hi," "OK," "find," "my phone," and the like. Instead, the authorized user of computing device 102 may specify any group of two or more arbitrary words as the trigger phrase associated with the request to trigger device finder functionality.

Device finder setup module 232 may execute at one or more processors 104 to receive voice input from the authorized user to specify the trigger phrase associated with a request to trigger device finder functionality. The authorized user of computing device 102 may speak a phrase and microphone 106 may capture audio signals that include the phrase spoken by the authorized user. One or more processors 104, such as processor 240, may process the audio signals captured by microphone 106 to determine, from the audio signals captured by microphone 106, the voice input provided by the authorized user and may store the voice input provided by the authorized user as voice sample 110, which may be an audio file containing digital audio data of the voice input provided by the authorized user as the phrase associated with a request to trigger device finder functionality. Voice sample 110 may be encoded using any suitable audio coding format, such as waveform audio file format (WAVE), advanced audio coding (AAC), and the like.

In some examples, instead of speaking the trigger phrase, the authorized user may enter the trigger phrase at computing device 102 via any other means. For example, the authorized user may provide user input at a keyboard of computing device 102 to enter the trigger phrase as text entered at the keyboard of computing device 102, and one or more processors 104 may store the trigger phrase entered by the authorized user in one or more storage components 228 of computing device 102. If the authorized user enters the trigger phrase at computing device 102 via a means other than providing voice input, computing device 102 may also direct the authorized user to provide voice input at computing device 102 that can be used to perform voice authentication to recognize the voice of the authorized user. In this example, the authorized user of computing device 102 may speak one or more phrases, sentences, and the like, and microphone 106 may capture audio signals that include the vocal input provided by the authorized user. One or more processors 104 may store the voice input provided by the authorized user as voice sample 110, which may be used to perform voice authentication to recognize the voice of the authorized user.

When device finder setup module 232 executes at one or more processors 104 to perform the set up and configuration process for the device finder functionality, device finder setup module 232 may also enable an authorized user of computing device 102 to specify the alert sound 230 to be audibly outputted by speaker 108 of computing device 102 in response to computing device 102 receiving a request to trigger device finder functionality. In some examples, an authorized user of computing device 102 may select a sound out of a set of sounds stored in computing device 102 as the alert sound 230 to be emitted by speaker 108 of computing device 102 in response to computing device 102 receiving a request to trigger device finder functionality. In some examples, an authorized user of computing device 102 may download an audio file to computing device 102 via a network, such as the Internet, or may copy an audio file to computing device 102 via an external disk (e.g., a Secure Digital card) and specify the downloaded or copied audio file as the alert sound 230. In some examples, an authorized user of computing device 102 may use microphone 106 to capture sound as the alert sound 230.

Once the setup of the device finder feature is finished, microphone 106 may be configured to continuously capture audio signals from the surrounding environment of computing device 102, and one or more processors 104 may be configured to determine whether the audio signals captured by microphone 106 include voice input from the authorized user of computing device 102 that includes the trigger phrase. If one or more processors 104 determines that the audio captured by microphone 106, includes voice input from the authorized user of computing device 102 that includes the trigger phrase, one or more processors 104 may be configured to cause speaker 108 to audibly output alert sound 230 to assist the authorized user in locating computing device 102. For example, one or more processors 104 may interface with speaker 108, such as by sending one or more signals to speaker 108, or by sending one or more signals to a processor (e.g., a digital-to-analog converter, coder/decoder, etc.) that interfaces with speaker 108 to cause speaker 108 to audibly output alert sound 230.

One or more processors 104 may operate in an always-on mode in order to determine whether microphone 106 has received audio signals that include voice input from the authorized user of computing device 102 that includes trigger phrase. That is, one or more processors 104, such as processor 240, and microphone 106 may remain powered on to capture audio signals from the surrounding environment of computing device 102 and to determine audio signals that include voice input from the authorized user of computing device 102 that includes trigger phrase even when computing device 102 is in an idle state.

Computing device 102 may be in an active state when computing device 102 is being used by a user, and may transition from an active state to an idle state after a specified period of inactivity. When computing device 102 transitions to an idle state, computing device 102 may turn off various components of computing device 102, such as the display, CPU 242, memory buses, one or more communication units 224, and the like. When computing device 102 is in the idle state, processor 240, and microphone 106 may remain powered on to capture audio signals from the surrounding environment of computing device 102 and to determine audio signals that include voice input from the authorized user of computing device 102 that includes trigger phrase. If processor 240 determines that the audio signals captured by microphone 106 include voice input from the authorized user of computing device 102 that includes trigger phrase, processor 240 may cause computing device 102 to turn on, such as by sending a signal to CPU 242 to power on.

In certain situations, in order to further decrease the amount of power used by computing device 102, such as to increase the battery life of computing device 102, computing device 102 may turn off any always-on hardware, such as microphone 106 and processor 240 and may stop listening for voice input from the authorized user containing the trigger phrase. That is, in certain situations, computing device 102 may refrain from capturing audio signals in the surrounding environment of computing device 102 and refrain from determining whether the audio signals includes voice input from the authorized user that contains the trigger phrase.

For example, if one or more processors 104 determines that computing device 102 is in an unlocked state, meaning that the authorized user has unlocked computing device 102 and is actively using computing device 102, CPU 242 may turn off microphone 106 and processor 240 to stop listening for voice input from the authorized user containing the trigger phrase.

In another example, if computing device 102 is in a locked state, meaning that the authorized user is not currently actively using computing device 102, CPU 242 may turn off microphone 106 and processor 240 to stop listening for voice input from the authorized user containing the trigger phrase if computing device 102 last detected user interactions with the authorized user within a specified time threshold, such as within the last 10 seconds, the last 30 seconds, and the like. This may be because if the authorized has just interacted with computing device 102 (e.g., within the specified time threshold), it is likely that the authorized user is still near computing device 102 and therefore may be unlikely to need to trigger device finder functionality of computing device 102.

In some examples, one or more processors 104 may determine, without sending the audio signals off-device (e.g., to the cloud), whether the audio signals captured by microphone 106 include voice input from the authorized user of computing device 102 that includes trigger phrase, by comparing the audio signals with data received from the authorized user to determine whether the audio signals include voice input from the authorized user of computing device 102 that includes trigger phrase. For example, one or more processors 104 may extract one or more features from the audio signals and may compare the one or more features from the audio signals with one or more features of voice sample 110 to determine whether the audio signals include voice input that matches voice sample 110.

For example, one or more processors 104 may extract frequency components of the audio signals and may compare the frequency components of the audio signals with the frequency components of voice sample 110 to determine whether the audio signals include voice input that matches voice sample 110. If one or more processors 104 determines that the frequency components of the audio signals differs from the frequency components of voice sample 110 by no more than a specified threshold (e.g., 5% or less, 10% or less, etc.), one or more processors 104 may determine that the audio signals captured by microphone 106 include voice input from the authorized user of computing device 102 that includes trigger phrase. If one or more processors 104 determines that the audio signals captured by microphone 106 include voice input from the authorized user of computing device 102 that includes trigger phrase, one or more processors 104 may be configured to cause speaker 108 to audibly output alert sound 230 aid the authorized user in locating computing device 102.

In some examples, one or more processors 104 may perform on-device speech recognition on the audio signals captured by microphone 106 to determine whether the audio signals captured by microphone 106 include voice input that includes trigger phrase. By performing speech recognition on-device (i.e., on computing device 102), one or more processors 104 may not send any indication of the audio signals captured by microphone 106 to another computing device or system (e.g., to the cloud). One or more processors 104 may perform any suitable speech recognition algorithm to recognize spoken words in the audio signals, such as hidden Markov models, dynamic time warping, neural network algorithms and the like. One or more processors 104 may, in response to performing speech recognition to recognize spoken words in the audio signals, compare the recognized spoken words in the audio signals with the trigger phrase indicated by voice sample 110 to determine whether the trigger phrase was spoken and captured by microphone 106.

In some examples, when computing device 102 is in an idle state, recognizing that the trigger phrase was spoken and captured by microphone 106 may cause computing device 102 to transition from the idle state to an active state. For example, by recognizing that the trigger phrase was spoken and captured by microphone 106, processor 240 may cause CPU 242 to power on in order to determine whether the trigger phrase in the audio signals captured by microphone 106 was spoken by an authorized user.

If one or more processors 104 determines that the trigger phrase was spoken and captured by microphone 106, one or more processors 104 may determine whether the trigger phrase in the audio signals captured by microphone 106 was spoken by an authorized user based at least in part on data provided by the authorized user of computing device 102. For example, one or more processors 104 may use voice sample 110 to determine whether the audio signals include voice input that matches voice sample 110, such as by comparing one or more features extracted from the audio signal with one or more features of voice sample 110. For example, one or more processors 104 may compare frequency components of the audio signals with the frequency components of voice sample 110 to determine if the frequency components of the audio signals differs from the frequency components of voice sample 110 by no more than a specified threshold (e.g., 5% or less, 10% or less, etc.). If one or more processors 104 determines that the frequency components of the audio signals differs from the frequency components of voice sample 110 by no more than the specified threshold, one or more processors 104 may determine that the audio signals captured by microphone 106 include voice input from the authorized user of computing device 102 that includes trigger phrase. If one or more processors 104 determines that the audio signals captured by microphone 106 include voice input from the authorized user of computing device 102 that includes trigger phrase, one or more processors 104 may be configured to cause speaker 108 to audibly output alert sound 230 aid the authorized user in locating computing device 102.

However, if one or more processors 104 determines that the frequency components of the audio signals differs from the frequency components of voice sample 110 by more than a specified threshold (e.g., 5% or less, 10% or less, etc.), one or more processors 104 may determine that the audio signals captured by microphone 106 include voice input that is not from the authorized user of computing device 102. Because one or more processors 104 has already determined that the voice input in the audio signals includes the trigger phrase, one or more processors 104 may determine that the trigger phrase associated with the request to trigger device finder functionality was spoken by a user that is not the authorized user of computing device 102.

In some examples, in response to determining that the trigger phrase associated with the request to trigger device finder functionality was spoken by a user that is not the authorized user of computing device 102, one or more processors 104 may be configured to output a notification to notify the authorized user that the trigger phrase associated with the request to trigger device finder functionality was spoken by a user that is not the authorized user of computing device 102. Notifying the authorized user of computing device 102 that the trigger phrase was spoken by a potentially unauthorized user of computing device 102 may enable the authorized user of computing device 102 to learn that the trigger phrase is no longer a secret and may cause the authorized user of computing device 102 to specify a new trigger phrase for sending a request to trigger device finder functionality to computing device 102.

In some examples, to output the notification to notify the authorized user that the trigger phrase associated with the request to trigger device finder functionality was spoken by a user that is not the authorized user of computing device 102, computing device 102 may output the notification for display at a display device of computing device 102. In some examples, to output the notification to notify the authorized user that the trigger phrase associated with the request to trigger device finder functionality was spoken by a user that is not the authorized user of computing device 102, computing device 102 may send an e-mail to an e-mail address associated with the authorized user, or may send a text message to the authorized user. In some examples, if the authorized user has an associated wearable device, such as a smart watch, computing device 102 may connect with the wearable device, such as via Wi-Fi or Bluetooth, and may send the notification to the wearable device.

As discussed above, one or more processors 104 may, in response to determining that the voice input in the audio signals captured by microphone 106 includes the trigger phrase and that the voice input was from an authorized user of computing device 102, cause speaker 108 to audibly output alert sound 230 to assist the authorized user in locating computing device 102. In some examples, instead of or in addition to alert sound 230, one or more processors 104 may also cause speaker 108 to output additional audio to assist the authorized user in locating computing device 102.

In some examples, if computing device 102 is able to determine where it is located, one or more processors 104 may also cause speaker 108 to output audio indicative of the location of computing device 102, such as speech audio. For example, if one or more processors 104 determines that computing device 102 is located in the master bedroom of the authorized user's home, one or more processors 104 may cause speaker 108 to audibly output the phrase "I'm in the master bedroom" to indicate to the authorized user that computing device 102 is located in the master bedroom of the authorized user's home.

Computing device 102 may be able to determine where it is located, such as where computing device 102 is located within the authorized user's home, in any suitable fashion. In some examples, if the authorized user's home is a smart home, there may be different electronic devices such as smart speakers, desktop computers, laptop computers, Bluetooth beacons, and the like that are located around the authorized user's home. Computing device 102 may therefore determine, based on which of these devices to which computing device 102 is wirelessly connected, the location of computing device 102 within the authorized user's home.

In some examples, computing device 102 may be able to determine its location in the authorized user's home based on the signal strength of wireless connections between computing device 102 and one or more external devices in the authorized user's home. For example, one or more processors 104 may be configured to determine the signal strength of Bluetooth connections between one or more communication units 224 of computing device 102 and the one or more external devices, and may determine that computing device 102 is closest to an external device if the signal strength of the Bluetooth connection between one or more communication units 224 of computing device 102 and the external device is higher than the signal strengths of the Bluetooth connections between one or more communication units 224 of computing device 102 and any other external device.

One or more processors 104 may therefore be configured to determine where the external device closest to computing device 102 is located in the authorized user's home. For example, if the external device has an associated name, such as "refrigerator," "bedroom night light," "bathroom speaker," and the like, one or more processors 104 may be able to determine where the external device closest to computing device 102 is located in the authorized user's home based on the name of the external device. One or more processors 104 may therefore determine that computing device 102 is located in the same room as the external device closest to computing device 102, and may cause speaker 108 to output audio indicative of the room of the authorized user's home in which computing device 102 is located. For example, if the external device closest to computing device 102 is named "refrigerator," one or more processors 104 may determine that computing device 102 is in the kitchen, and may accordingly cause speaker 108 to audibly output the phrase "I'm in the kitchen" to indicate to the authorized user that computing device 102 is located in the kitchen of the authorized user's home.

In some examples, one or more processors 104 are configured to adaptively determine the volume at which speaker 108 outputs alert sound 230. That is, one or more processors 104 may be configured to determine contextual information associated with computing device 102 and/or contextual information associated with the authorized user, and may determine the volume at which speaker 108 outputs alert sound 230 based on the contextual information associated with computing device 102 and/or contextual information associated with the authorized user.

In some examples, one or more processors 104 may be configured to adaptively determine the volume at which speaker 108 outputs alert sound 230 based on the volume of the voice input in the audio signals captured by microphone 106 that includes the trigger phrase. If the volume of the voice input in the audio signals captured by microphone 106 is relatively soft, one or more processors 104 may determine that the authorized user is relatively far away from computing device 102, and may increase the volume at which speaker 108 outputs alert sound 230. Conversely, if the volume of the voice input in the audio signals captured by microphone 106 is relatively high, one or more processors 104 may determine that the authorized user is relatively closer to computing device 102, and may decrease the volume at which speaker 108 outputs alert sound 230

In some examples, one or more processors 104 may be configured to adaptively determine the volume at which speaker 108 outputs alert sound 230 based on the volume of the background noise in the audio signals captured by microphone 106 that includes the trigger phrase. The background noise in the audio signals may be audio other than the voice input in the audio signals, and one or more processors 104 may determine the background noise in the audio signals and the volume of the background noise in the audio signals via any suitable techniques. If the volume of the background noise in the audio signals captured by microphone 106 is relatively soft, one or more processors 104 may increase the volume at which speaker 108 outputs alert sound 230. Conversely, if the volume of the background noise in the audio signals captured by microphone 106 is relatively low, one or more processors 104 may decrease the volume at which speaker 108 outputs alert sound 230

In some examples, one or more processors 104 may be configured to adaptively determine the volume at which speaker 108 outputs alert sound 230 based on the location of computing device 102. For example, one or more processors 104 may use a GPS receiver of computing device 102 to determine the current location of computing device 102, and may determine whether computing device 102 is at the home location of the authorized user based on comparing the current location of computing device 102 with the home location of the authorized user. For example, the authorized user may have previously inputted their home location at computing device 102, or computing device 102 may have determined that the home location of the authorized user is where computing device 102 is located the majority of most days. If computing device 102 is not at the home location of the authorized user, one or more processors 104 may increase the volume at which speaker 108 outputs alert sound 230 due to locations outside of the authorized user's home potentially having louder background noises. Conversely, if computing device 102 is at the home location of the authorized user, one or more processors 104 may decrease the volume at which speaker 108 outputs alert sound 230.

In some examples, one or more processors 104 may be configured to adaptively determine the volume at which speaker 108 outputs alert sound 230 based on determining if computing device 102 is underneath an object and/or is being at least partially covered by an object. One or more processors 104 may be configured to determine if computing device 102 is underneath an object and/or is being at least partially covered by an object using sensors 234, such as a proximity sensor, a camera, a pressure sensor, and the like. For example, one or more processors 104 may use a proximity sensor to determine whether an object is proximate to the proximity sensor. If one or more processors 104 determines that an object is proximate to the proximity sensor, one or more processors 104 may determine that computing device 102 is underneath an object and/or is being at least partially covered by an object. In another example, if one or more processors 104 determines that a camera of computing device 102 is fully obscured, one or more processors 104 may determine that computing device 102 is underneath an object and/or is being at least partially covered by an object.

If computing device 102 is underneath an object and/or is being at least partially covered by an object, the object may potentially muffle speaker 108. Thus, if one or more processors 104 determines that computing device 102 is underneath an object and/or is being at least partially covered by an object, one or more processors 104 may increase the volume at which speaker 108 outputs alert sound 230.

Besides triggering the device finder feature, computing device 102 may also perform the techniques described herein to use voice authentication to protect additional functionalities of computing device 102 from being accessed by unauthorized users. In some examples, computing device 102 may require an authorized user to speak a specified trigger phrase in order to unlock computing device 102, to access one or more applications of computing device 102, to change settings of computing device 102, and the like.

Figure 3:
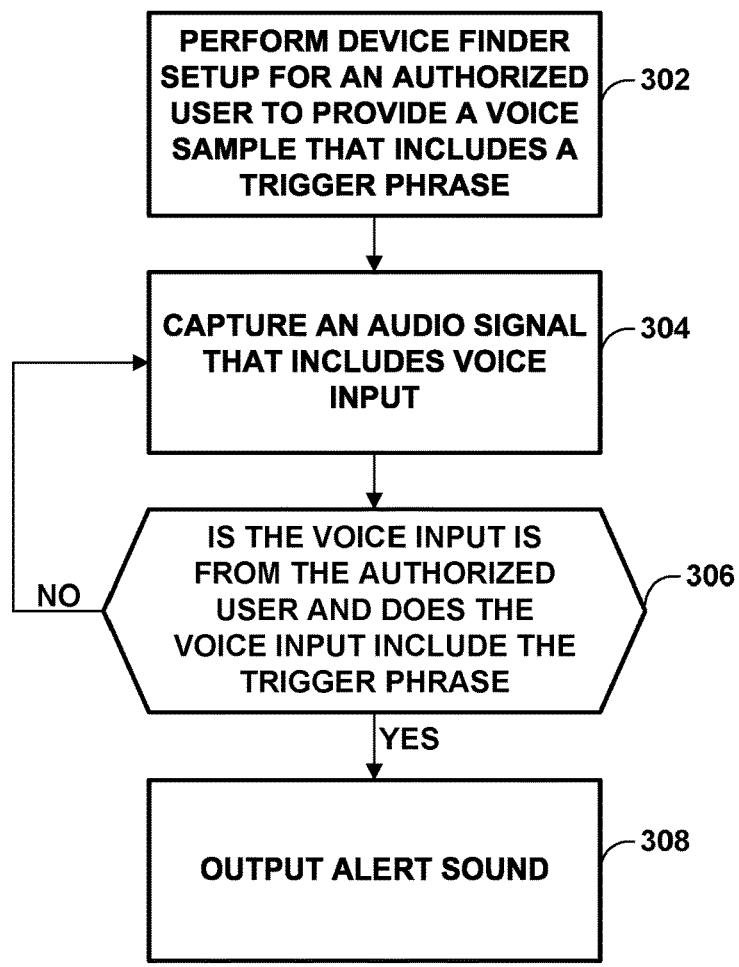
FIG. 3 is a flowchart illustrating an example method for performing device finding using voice authentication, in accordance with the techniques of this disclosure.

FIG. 3 is a flowchart illustrating an example method for performing device finding using voice authentication, in accordance with the techniques of this disclosure. Although described with respect to computing device 102 of FIGS. 1 and 2, it should be understood that other devices may be configured to perform a method similar to that of FIG. 3.

As shown in FIG. 3, prior to performing device finding using voice authentication, computing device 102 may perform device finder setup so that an authorized user of computing device 102 may provide a voice sample that includes a trigger phrase associated with a request to trigger device finder functionality (302). That is, computing device 102 may use microphone 106 to capture an audio of the authorized user saying a phrase (i.e., a group of two or more words) and may save the captured audio of the authorized user saying the phrase as the voice sample. In addition, during the device finder setup process, computing device 102 may enable the authorized user to select an alert sound to be audibly outputted by speaker 108 of computing device 102 when the device finder functionality is triggered. For example, computing device 102 may enable the authorized user to select an alert sound out of a plurality of different alert sounds, enable the authorized user to transfer an audio file to computing device 102 as the alert sound, and the like.

Once setup is complete for the device finder functionality, the authorized user of computing device 102 may trigger the device finder functionality by saying the trigger phrase specified during device finder setup. To listen for the trigger phrase, microphone 106 may capture audio signals from the surrounding environment of computing device 102. When microphone 106 captures an audio signal that includes voice input (304), computing device 102 may determine whether the voice input in the audio signal is from an authorized user and includes the previously-specified trigger phrase (306). For example, computing device 102 may compare the voice input in the captured audio signal with the voice sample.

If computing device 102 determines that the voice input in the captured audio signal does not match the voice sample, computing device 102 may determine that the voice input in the captured audio signal is either not from the authorized user and/or doesn't include the trigger phrase ("NO" branch), and computing device 102 may return to block 304 to capture audio signals. If computing device 102 determines that the voice input in the captured audio signal matches the voice sample ("YES" branch), computing device 102 may determine that the voice input in the captured audio signal is from the authorized user and includes the trigger phrase, and computing device 102 may cause speaker 108 to output the selected alert sound to assist the authorized user to locate computing device 102 (308).

Figure 4:
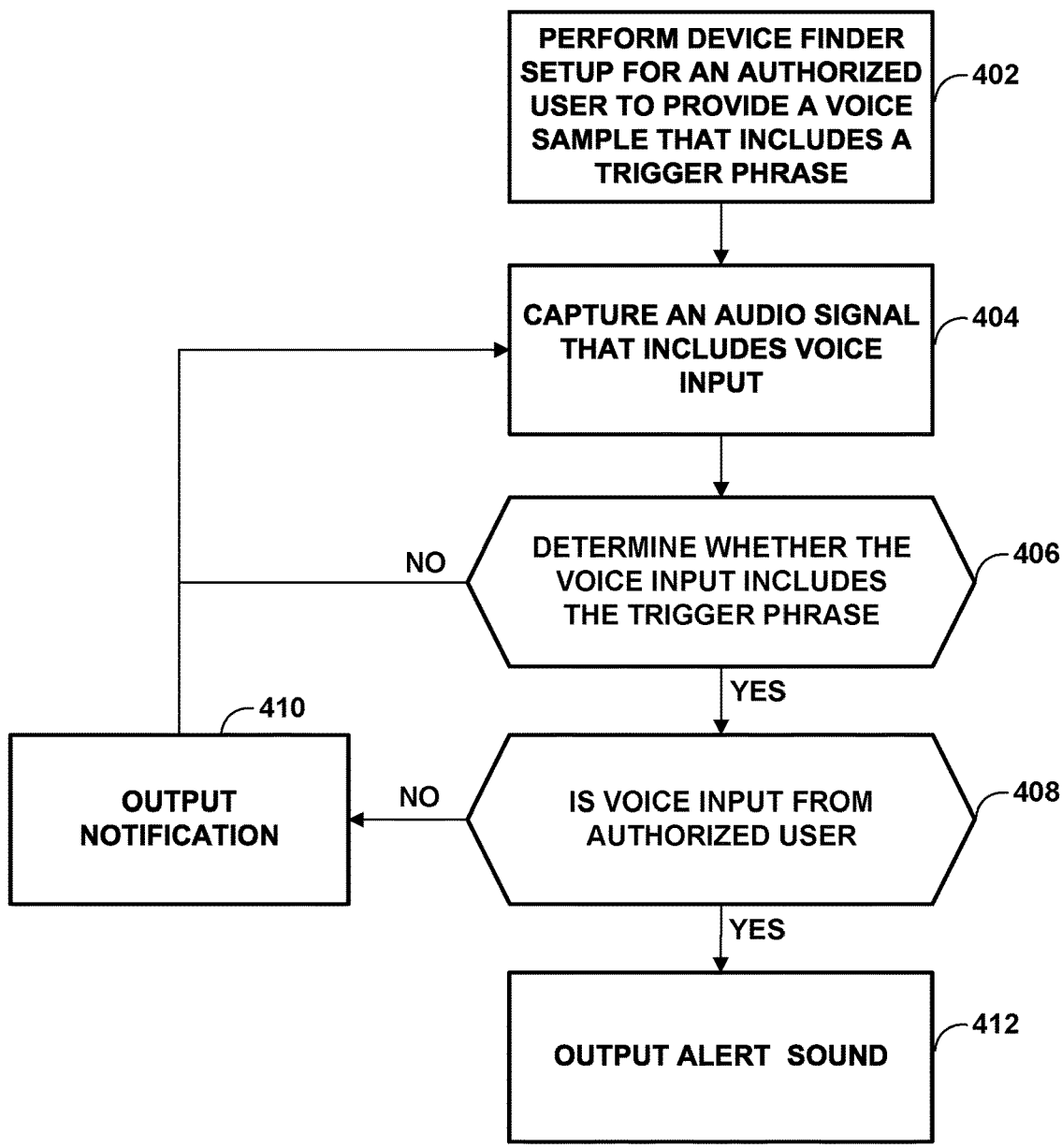
FIG. 4 is a flowchart illustrating an example method for performing device finding using voice authentication, in accordance with the techniques of this disclosure.

FIG. 4 is a flowchart illustrating an example method for performing device finding using voice authentication, in accordance with the techniques of this disclosure. Although described with respect to computing device 102 of FIGS. 1 and 2, it should be understood that other devices may be configured to perform a method similar to that of FIG. 4.

As shown in FIG. 4, prior to performing device finding using voice authentication, computing device 102 may perform device finder setup so that an authorized user of computing device 102 may provide a voice sample that includes a trigger phrase associated with a request to trigger device finder functionality (402). That is, computing device 102 may use microphone 106 to capture an audio of the authorized user saying a phrase (i.e., a group of two or more words) and may save the captured audio of the authorized user saying the phrase as the voice sample. In addition, during the device finder setup process, computing device 102 may enable the authorized user to select an alert sound to be audibly outputted by speaker 108 of computing device 102 when the device finder functionality is triggered. For example, computing device 102 may enable the authorized user to select an alert sound out of a plurality of different alert sounds, enable the authorized user to transfer an audio file to computing device 102 as the alert sound, and the like.

Once setup is complete for the device finder functionality, the authorized user of computing device 102 may trigger the device finder functionality by saying the trigger phrase specified during device finder setup. To listen for the trigger phrase, microphone 106 may capture audio signals from the surrounding environment of computing device 102. When microphone 106 captures an audio signal that includes voice input (404), computing device 102 may determine whether the voice input in the audio signal includes the previously-specified trigger phrase (406). For example, computing device 102 may perform voice recognition to determine whether the voice input in the captured audio signal includes the trigger phrase.

If computing device 102 determines that the voice input in the audio signal does not include the trigger phrase ("NO" branch), computing device 102 may return to block 404 to capture audio signals. If computing device 102 determines that the voice input in the audio signal does include the trigger phrase ("YES" branch), computing device 102 may determine whether the voice input is from the authorized user (408).

For example, computing device 102 may compare the voice input in the captured audio signal with the voice sample to determine whether the voice input is from the authorized user. If computing device 102 determines that the voice input in the captured audio signal does not match the voice sample, computing device 102 may determine that the voice input in the captured audio signal is not from the authorized user ("NO" branch), computing device 102 may determine that a user other than the authorized user has knowledge of the trigger phrase and may output a notification to notify the authorized user that the trigger phrase was spoken by a user that is not the authorized user of computing device 102 (410), and computing device 102 may return to block 404 to capture audio signals.

If computing device 102 determines that the voice input in the captured audio signal matches the voice sample ("YES" branch), computing device 102 may determine that the voice input in the captured audio signal is from the authorized user, and computing device 102 may cause speaker 108 to output the selected alert sound to assist the authorized user to locate computing device 102 (412).

Figure 5:
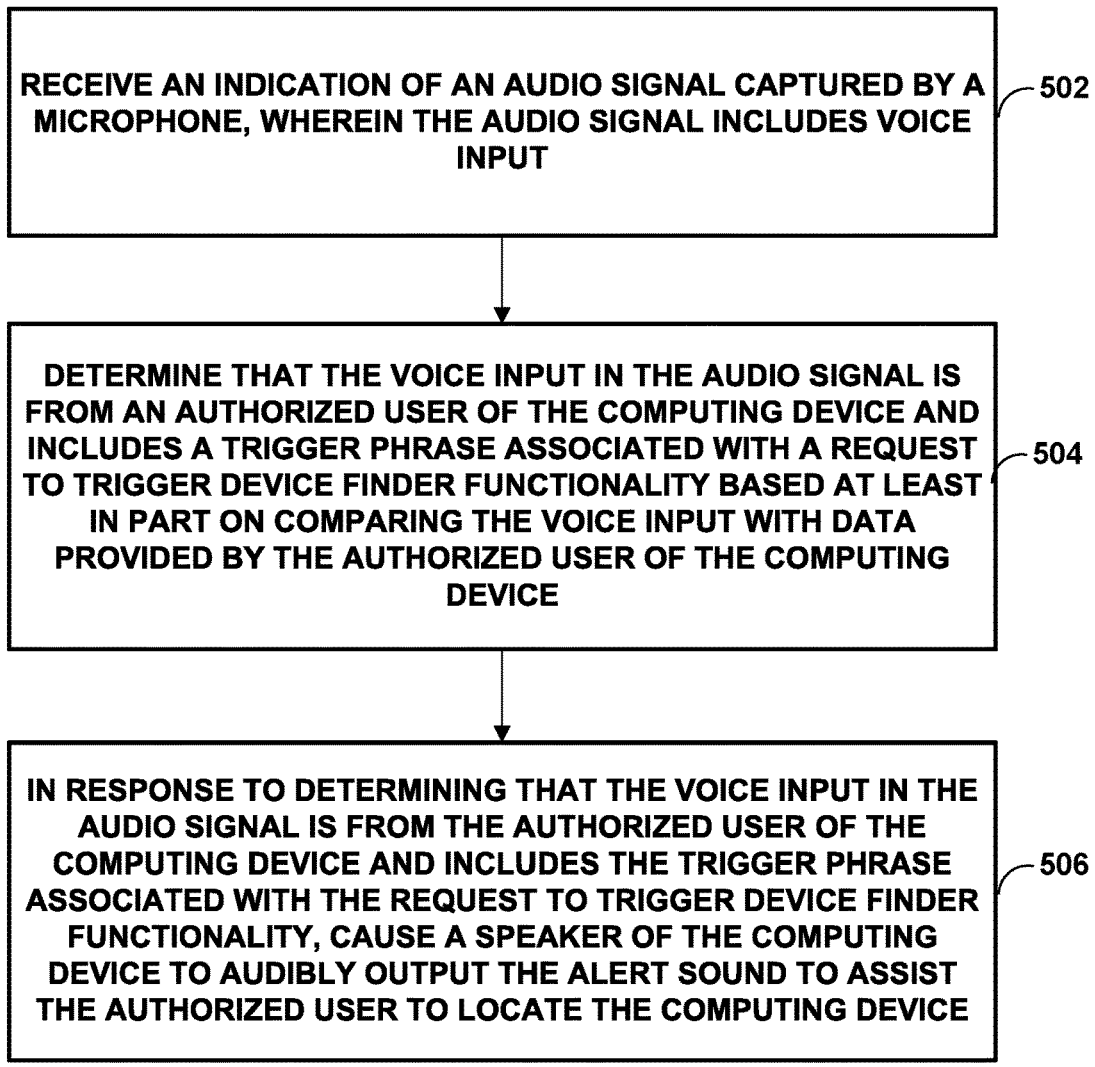
FIG. 5 is a flowchart illustrating an example method for performing device finding using voice authentication, in accordance with the techniques of this disclosure.

FIG. 5 is a flowchart illustrating an example method for performing device finding using voice authentication, in accordance with the techniques of this disclosure. Although described with respect to computing device 102 of FIGS. 1 and 2, it should be understood that other devices may be configured to perform a method similar to that of FIG. 5.

As shown in FIG. 5, one or more processors 104 of computing device 102 may receive an indication of an audio signal captured by a microphone 106, where the audio signal includes voice input (502). One or more processors 104 may determine that the voice input in the audio signal is from an authorized user of the computing device 102 and includes a trigger phrase associated with a request to trigger device finder functionality based at least in part on comparing the voice input with data provided by the authorized user of the computing device 102 (504). One or more processors 104 may, in response to determine that the voice input in the audio signal is from the authorized user of the computing device 102 and includes the trigger phrase associated with the request to trigger device finder functionality, cause a speaker 108 of the computing device 102 to audibly output the alert sound to assist the authorized user to locate the computing device 102 (506).

In some examples, the data provided by the authorized user of computing device 102 may include a voice sample 110 provided by the authorized user of the computing device 102, and to determine that the voice input in the audio signal is from the authorized user of the computing device 102 and includes the trigger phrase associated with the request to trigger device finder functionality, the one or more processors 104 may further compare a first one or more features of the voice input in the audio signal with a second one or more features of the voice sample 110 provided by the authorized user of the computing device 102 to determine that the voice input in the audio signal is from the authorized user of the computing device 102 and includes the trigger phrase associated with the request to trigger device finder functionality.

In some examples, the data provided by the authorized user of computing device 102 may include a voice sample 110 provided by the authorized user of the computing device 102, and to determine that the voice input in the audio signal is from the authorized user of the computing device 102 and includes the trigger phrase associated with the request to trigger device finder functionality, the one or more processors 104 may further perform speech recognition to determine that the voice input in the audio signal includes the trigger phrase associated with the request to trigger device finder functionality, and in response to determine that the voice input in the audio signal includes the trigger phrase associated with the request to trigger device finder functionality, compare a first one or more features of the voice input with a second one or more features of the voice sample 110 provided by the authorized user of the computing device 102 to determine that the voice input is from the authorized user of the computing device 102.

In some examples, the one or more processors 104 may, before receiving the indication of the audio signal captured by the microphone, receive an indication of a second audio signal captured by the microphone 106, wherein the second audio signal includes a second voice input from the authorized user, wherein the second voice input includes a phrase spoken by the authorized user. The one or more processors 104 may further determine the phrase as the trigger phrase associated with the request to trigger device finder functionality. The one or more processors 104 may further store the second voice input as a voice sample 110 in memory of the computing device 102.

In some examples, one or more processors 104 may, before receiving the indication of the audio signal captured by the microphone 106, receive an indication of a selection by the authorized user of the alert sound out of a plurality of alert sounds.

In some examples, to cause the speaker of the computing device 102 to audibly output the alert sound, the one or more processors 104 may further determine whether the computing device 102 is located at a home location associated with the computing device 102, determine a volume at which the speaker audibly outputs the alert sound based at least in part on whether the computing device 102 is located at the home location associated with the computing device 102, and cause the speaker 108 to audibly output the alert sound at the determined volume.

The method of claim 1, wherein to cause the speaker of the computing device 102 to audibly output the alert sound, the one or more processors 104 may further determine, using one or more sensors 234 of the computing device 102, that the computing device 102 is at least partially covered by an object, in response to determine that the computing device 102 is at least partially covered by the object, increase the volume at which the speaker 108 audibly outputs the alert sound based at least in part on the location of the computing device 102, and cause the speaker 108 to audibly output the alert sound at the increased volume.

The method of claim 1, wherein to cause the speaker of the computing device 102 to audibly output the alert sound, the one or more processors 104 may further determine an input volume of the voice input, determine a volume at which the speaker 108 audibly outputs the alert sound based at least in part on the input volume of the voice input, and cause the speaker 108 to audibly output the alert sound at the determined volume.

In some examples, the one or more processors 104 may further receive an indication of a second audio signal captured by the microphone 106, where the second audio signal includes a second voice input, performing speech recognition to determine that the second voice input in the second audio signal includes a trigger phrase associated with a request to trigger device finder functionality, in response to determine that the second voice input in the second audio signal includes the trigger phrase associated with the request to trigger device finder functionality, determine that the second voice input is not from the authorized user of the computing device 102, and in response to determine that the second voice input is not from the authorized user of the computing device 102, output a notification to notify the authorized user that the trigger phrase associated with the request to trigger device finder functionality was spoken by a user that is not the authorized user of the computing device 102.

This disclosure includes the following aspects:

Aspect 1: A method includes receiving, by one or more processors of a computing device, an indication of an audio signal captured by a microphone, wherein the audio signal includes voice input; determining, by the one or more processors, that the voice input in the audio signal is from an authorized user of the computing device and includes a trigger phrase associated with a request to trigger device finder functionality based at least in part on comparing the voice input with data provided by the authorized user of the computing device; and in response to determining that the voice input in the audio signal is from the authorized user of the computing device and includes the trigger phrase associated with the request to trigger device finder functionality, causing, by the one or more processors, a speaker of the computing device to audibly output an alert sound to assist the authorized user to locate the computing device.

Aspect 2: The method of aspect 1, wherein the data provided by the authorized user of the computing device includes a voice sample provided by the authorized user of the computing device, and wherein determining that the voice input in the audio signal is from the authorized user of the computing device and includes the trigger phrase associated with the request to trigger device finder functionality further comprises: comparing, by the one or more processors, a first one or more features of the voice input in the audio signal with a second one or more features of the voice sample provided by the authorized user of the computing device to determine that the voice input in the audio signal is from the authorized user of the computing device and includes the trigger phrase associated with the request to trigger device finder functionality.

Aspect 3: The method of any of aspects 1 and 2, wherein the data provided by the authorized user of the computing device includes a voice sample provided by the authorized user of the computing device, and wherein determining that the voice input in the audio signal is from the authorized user of the computing device and includes the trigger phrase associated with the request to trigger device finder functionality further comprises: performing, by the one or more processors, speech recognition to determine that the voice input in the audio signal includes the trigger phrase associated with the request to trigger device finder functionality; and in response to determining that the voice input in the audio signal includes the trigger phrase associated with the request to trigger device finder functionality, comparing, by the one or more processors, a first one or more features of the voice input with a second one or more features of the voice sample provided by the authorized user of the computing device to determine that the voice input is from the authorized user of the computing device.

Aspect 4: The method of any of aspects 1-3, further includes before receiving the indication of the audio signal captured by the microphone, receiving, by the one or more processors, an indication of a second audio signal captured by the microphone, wherein the second audio signal includes a second voice input from the authorized user, wherein the second voice input includes a phrase spoken by the authorized user; determining, by the one or more processors, the phrase as the trigger phrase associated with the request to trigger device finder functionality; and storing, by the one or more processors, the second voice input as a voice sample in memory of the computing device.

Aspect 5: The method of any of aspects 1-4, further includes before receiving the indication of the audio signal captured by the microphone, receiving, by the one or more processors, an indication of a selection by the authorized user of the alert sound out of a plurality of alert sounds.

Aspect 6: The method of any of aspects 1-5, wherein causing the speaker of the computing device to audibly output the alert sound further comprises: determining, by the one or more processors, whether the computing device is located at a home location associated with the computing device; determining, by the one or more processors, a volume at which the speaker audibly outputs the alert sound based at least in part on whether the computing device is located at the home location associated with the computing device; and causing, by the one or more processors, the speaker to audibly output the alert sound at the determined volume.

Aspect 7: The method of any of aspects 1-6, wherein causing the speaker of the computing device to audibly output the alert sound further comprises: determining, by the one or more processors using one or more sensors of the computing device, that the computing device is at least partially covered by an object; in response to determining that the computing device is at least partially covered by the object, increasing, by the one or more processors, a volume at which the speaker audibly outputs the alert sound based at least in part on the location of the computing device; and causing, by the one or more processors, the speaker to audibly output the alert sound at the increased volume.

Aspect 8: The method of any of aspects 1-7, wherein causing the speaker of the computing device to audibly output the alert sound further comprises: determining, by the one or more processors, an input volume of the voice input; determining, by the one or more processors, a volume at which the speaker audibly outputs the alert sound based at least in part on the input volume of the voice input; and causing, by the one or more processors, the speaker to audibly output the alert sound at the determined volume.

Aspect 9: The method of any of aspects 1-8, further includes receiving, by the one or more processors, an indication of a second audio signal captured by the microphone, wherein the second audio signal includes a second voice input; performing, by the one or more processors, speech recognition to determine that the second voice input in the second audio signal includes a trigger phrase associated with a request to trigger device finder functionality; in response to determining that the second voice input in the second audio signal includes the trigger phrase associated with the request to trigger device finder functionality, determining, by the one or more processors, that the second voice input is not from the authorized user of the computing device; and in response to determining that the second voice input is not from the authorized user of the computing device, outputting, by the one or more processors, a notification to notify the authorized user that the trigger phrase associated with the request to trigger device finder functionality was spoken by a user that is not the authorized user of the computing device.

Aspect 10: A computing device includes a memory configured to store data provided by an authorized user of the computing device; a microphone configured to capture an audio signal; a speaker; and processing circuitry configured to: receive an indication of the audio signal captured by the microphone, wherein the audio signal includes voice input; determine that the voice input in the audio signal is from the authorized user of the computing device and includes a trigger phrase associated with a request to trigger device finder functionality based at least in part on comparing the voice input with the data provided by the authorized user of the computing device; and in response to determining that the voice input in the audio signal is from the authorized user of the computing device and includes the trigger phrase associated with the request to trigger device finder functionality, cause the speaker to audibly output an alert sound to assist the authorized user to locate the computing device.

Aspect 11: The computing device of aspect 10, wherein the data provided by the authorized user of the computing device includes a voice sample provided by the authorized user of the computing device, and wherein to determine that the voice input in the audio signal is from the authorized user of the computing device and includes the trigger phrase associated with the request to trigger device finder functionality, the processing circuitry is further configured to: compare a first one or more features of the voice input in the audio signal with a second one or more features of the voice sample provided by the authorized user of the computing device to determine that the voice input in the audio signal is from the authorized user of the computing device and includes the trigger phrase associated with the request to trigger device finder functionality.

Aspect 12: The computing device of any of aspects 10 and 11, wherein the data provided by the authorized user of the computing device includes a voice sample provided by the authorized user of the computing device, and wherein to determine that the voice input in the audio signal is from the authorized user of the computing device and includes the trigger phrase associated with the request to trigger device finder functionality, the processing circuitry is further configured to: perform speech recognition to determine that the voice input in the audio signal includes the trigger phrase associated with the request to trigger device finder functionality; and in response to determining that the voice input in the audio signal includes the trigger phrase associated with the request to trigger device finder functionality, compare a first one or more features of the voice input with a second one or more features of the voice sample provided by the authorized user of the computing device to determine that the voice input is from the authorized user of the computing device.

Aspect 13: The computing device of any of aspects 10-12, wherein the processing circuitry is further configured to: before receiving the indication of the audio signal captured by the microphone, receive an indication of a second audio signal captured by the microphone, wherein the second audio signal includes a second voice input from the authorized user, wherein the second voice input includes a phrase spoken by the authorized user; determine the phrase as the trigger phrase associated with the request to trigger device finder functionality; and store the second voice input as a voice sample in the memory of the computing device.

Aspect 14: The computing device of any of aspects 10-13, wherein the processing circuitry is further configured to: before receiving the indication of the audio signal captured by the microphone, receive an indication of a selection by the authorized user of the alert sound out of a plurality of alert sounds.

Aspect 15: The computing device of any of aspects 10-14, wherein to cause the speaker of the computing device to audibly output the alert sound, the processing circuitry is further configured to: determine whether the computing device is located at a home location associated with the computing device; determine a volume at which the speaker audibly outputs the alert sound based at least in part on whether the computing device is located at the home location associated with the computing device; and cause the speaker to audibly output the alert sound at the determined volume.

Aspect 16: The computing device of any of aspects 10-15, wherein to cause the speaker of the computing device to audibly output the alert sound, the processing circuitry is further configured to: determine, using one or more sensors of the computing device, that the computing device is at least partially covered by an object; in response to determining that the computing device is at least partially covered by the object, increase a volume at which the speaker audibly outputs the alert sound based at least in part on the location of the computing device; and cause the speaker to audibly output the alert sound at the increased volume.

Aspect 17: The computing device of any of aspects 10-16, wherein to cause the speaker of the computing device to audibly output the alert sound, the processing circuitry is further configured to: determine an input volume of the voice input; determine a volume at which the speaker audibly outputs the alert sound based at least in part on the input volume of the voice input; and cause the speaker to audibly output the alert sound at the determined volume.

Aspect 18: The computing device of any of aspects 10-17, wherein the processing circuitry is further configured to: receive an indication of a second audio signal captured by the microphone, wherein the second audio signal includes a second voice input; perform speech recognition to determine that the second voice input in the second audio signal includes a trigger phrase associated with a request to trigger device finder functionality; in response to determining that the second voice input in the second audio signal includes the trigger phrase associated with the request to trigger device finder functionality, determine that the second voice input is not from the authorized user of the computing device; and in response to determining that the second voice input is not from the authorized user of the computing device, output a notification to notify the authorized user that the trigger phrase associated with the request to trigger device finder functionality was spoken by a user that is not the authorized user of the computing device.

Aspect 19: A non-transitory computer-readable storage medium having instructions stored thereon that, when executed, cause one or more processors of a computing device to: receive an indication of an audio signal captured by a microphone, wherein the audio signal includes voice input; determine that the voice input in the audio signal is from an authorized user of the computing device and includes a trigger phrase associated with a request to trigger device finder functionality based at least in part on comparing the voice input with data provided by the authorized user of the computing device; and in response to determining that the voice input in the audio signal is from the authorized user of the computing device and includes the trigger phrase associated with the request to trigger device finder functionality, cause a speaker of the computing device to audibly output an alert sound to assist the authorized user to locate the computing device.

Aspect 20: The non-transitory computer-readable storage medium of aspect 19, wherein the data provided by the authorized user of the computing device includes a voice sample provided by the authorized user of the computing device, and wherein the instructions that cause the one or more processors of the computing device to determine that the voice input in the audio signal is from the authorized user of the computing device and includes the trigger phrase associated with the request to trigger device finder functionality further cause the one or more processors to: compare a first one or more features of the voice input in the audio signal with a second one or more features of the voice sample provided by the authorized user of the computing device to determine that the voice input in the audio signal is from the authorized user of the computing device and includes the trigger phrase associated with the request to trigger device finder functionality.

Aspect 21: The non-transitory computer-readable storage medium of any of aspects 19 and 20, wherein the data provided by the authorized user of the computing device includes a voice sample provided by the authorized user of the computing device, and wherein the instructions that cause the one or more processors of the computing device to determine that the voice input in the audio signal is from the authorized user of the computing device and includes the trigger phrase associated with the request to trigger device finder functionality further cause the one or more processors to: perform speech recognition to determine that the voice input in the audio signal includes the trigger phrase associated with the request to trigger device finder functionality; and in response to determining that the voice input in the audio signal includes the trigger phrase associated with the request to trigger device finder functionality, compare a first one or more features of the voice input with a second one or more features of the voice sample provided by the authorized user of the computing device to determine that the voice input is from the authorized user of the computing device.

Aspect 22: The non-transitory computer-readable storage medium of any of aspects 19-21, wherein the instructions further cause the one or more processors of the computing device to: before receiving the indication of the audio signal captured by the microphone, receive an indication of a second audio signal captured by the microphone, wherein the second audio signal includes a second voice input from the authorized user, wherein the second voice input includes a phrase spoken by the authorized user; determine the phrase as the trigger phrase associated with the request to trigger device finder functionality; and store the second voice input as a voice sample in memory of the computing device.

Aspect 23: The non-transitory computer-readable storage medium of any of aspects 19-22, wherein the instructions further cause the one or more processors of the computing device to: before receiving the indication of the audio signal captured by the microphone, receive an indication of a selection by the authorized user of the alert sound out of a plurality of alert sounds.

Aspect 24: The non-transitory computer-readable storage medium of any of aspects 19-23, wherein the instructions that cause the one or more processors of the computing device to cause the speaker of the computing device to audibly output the alert sound further cause the one or more processors to: determine whether the computing device is located at a home location associated with the computing device; determine a volume at which the speaker audibly outputs the alert sound based at least in part on whether the computing device is located at the home location associated with the computing device; and cause the speaker to audibly output the alert sound at the determined volume.

Aspect 25: The non-transitory computer-readable storage medium of any of aspects 19-24, wherein the instructions that cause the one or more processors of the computing device to cause the speaker of the computing device to audibly output the alert sound further cause the one or more processors to: determine, using one or more sensors of the computing device, that the computing device is at least partially covered by an object; in response to determining that the computing device is at least partially covered by the object, increase a volume at which the speaker audibly outputs the alert sound based at least in part on the location of the computing device; and cause the speaker to audibly output the alert sound at the increased volume.

Aspect 26: The non-transitory computer-readable storage medium of any of aspects 19-25, wherein the instructions that cause the one or more processors to cause the speaker of the computing device to audibly output the alert sound, the processing circuitry further cause the one or more processors to: determine an input volume of the voice input; determine a volume at which the speaker audibly outputs the alert sound based at least in part on the input volume of the voice input; and cause the speaker to audibly output the alert sound at the determined volume.

Aspect 27: The non-transitory computer-readable storage medium of any of aspects 19-26, wherein the processing circuitry is further configured to: receive an indication of a second audio signal captured by the microphone, wherein the second audio signal includes a second voice input; perform speech recognition to determine that the second voice input in the second audio signal includes a trigger phrase associated with a request to trigger device finder functionality; and in response to determining that the second voice input in the second audio signal includes the trigger phrase associated with the request to trigger device finder.

Aspect 28: A computing device includes means for receiving an indication of an audio signal captured by a microphone, wherein the audio signal includes voice input; means for determining that the voice input in the audio signal is from an authorized user of the computing device and includes a trigger phrase associated with a request to trigger device finder functionality based at least in part on comparing the voice input with data provided by the authorized user of the computing device; and means for, in response to determining that the voice input in the audio signal is from the authorized user of the computing device and includes the trigger phrase associated with the request to trigger device finder functionality, causing a speaker of the computing device to audibly output an alert sound to assist the authorized user to locate the computing device.

Aspect 29: The computing device of aspect 28, wherein the data provided by the authorized user of the computing device includes a voice sample provided by the authorized user of the computing device, and wherein the means for determining that the voice input in the audio signal is from the authorized user of the computing device and includes the trigger phrase associated with the request to trigger device finder functionality further comprises: means for comparing a first one or more features of the voice input in the audio signal with a second one or more features of the voice sample provided by the authorized user of the computing device to determine that the voice input in the audio signal is from the authorized user of the computing device and includes the trigger phrase associated with the request to trigger device finder functionality.

Aspect 30: The computing device of any of aspects 28 and 29, wherein the data provided by the authorized user of the computing device includes a voice sample provided by the authorized user of the computing device, and wherein the means for determining that the voice input in the audio signal is from the authorized user of the computing device and includes the trigger phrase associated with the request to trigger device finder functionality further comprises: means for performing speech recognition to determine that the voice input in the audio signal includes the trigger phrase associated with the request to trigger device finder functionality; and means for in response to determining that the voice input in the audio signal includes the trigger phrase associated with the request to trigger device finder functionality, comparing a first one or more features of the voice input with a second one or more features of the voice sample provided by the authorized user of the computing device to determine that the voice input is from the authorized user of the computing device.

Aspect 31: The computing device of any of aspects 28-30, further includes means for before receiving the indication of the audio signal captured by the microphone, receiving an indication of a second audio signal captured by the microphone, wherein the second audio signal includes a second voice input from the authorized user, wherein the second voice input includes a phrase spoken by the authorized user; and means for determining the phrase as the trigger phrase associated with the request to trigger device finder functionality; and means for storing the second voice input as a voice sample in memory of the computing device.

Aspect 32: The computing device of any of aspects 28-31, further includes means for before receiving the indication of the audio signal captured by the microphone, receiving an indication of a selection by the authorized user of the alert sound out of a plurality of alert sounds.

Aspect 33: The computing device of any of aspects 28-32, wherein the means for causing the speaker of the computing device to audibly output the alert sound further comprises: means for determining whether the computing device is located at a home location associated with the computing device; means for determining a volume at which the speaker audibly outputs the alert sound based at least in part on whether the computing device is located at the home location associated with the computing device; and means for causing the speaker to audibly output the alert sound at the determined volume.

Aspect 34: The computing device of any of aspects 28-33, wherein the means for causing the speaker of the computing device to audibly output the alert sound further comprises: means for determining, using one or more sensors of the computing device, that the computing device is at least partially covered by an object; means for in response to determining that the computing device is at least partially covered by the object, increasing a volume at which the speaker audibly outputs the alert sound based at least in part on the location of the computing device; and means for causing the speaker to audibly output the alert sound at the increased volume.

Aspect 35: The computing device of any of aspects 28-34, wherein the means for causing the speaker of the computing device to audibly output the alert sound further comprises: means for determining an input volume of the voice input; means for determining a volume at which the speaker audibly outputs the alert sound based at least in part on the input volume of the voice input; and means for causing the speaker to audibly output the alert sound at the determined volume.

Aspect 36: The computing device of any of aspects 28-35, further includes means for receiving an indication of a second audio signal captured by the microphone, wherein the second audio signal includes a second voice input; means for performing speech recognition to determine that the second voice input in the second audio signal includes a trigger phrase associated with a request to trigger device finder functionality; means for in response to determining that the second voice input in the second audio signal includes the trigger phrase associated with the request to trigger device finder functionality, determining that the second voice input is not from the authorized user of the computing device; and means for in response to determining that the second voice input is not from the authorized user of the computing device, outputting a notification to notify the authorized user that the trigger phrase associated with the request to trigger device finder functionality was spoken by a user that is not the authorized user of the computing device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    receiving, by one or more processors of a computing device, from an external computing device, and via a network, an indication of an audio signal that includes voice input;
    determining, by the one or more processors, that the voice input in the audio signal is from an authorized user of the computing device and includes a trigger phrase associated with a request to trigger device finder functionality based at least in part on comparing the voice input with a voice sample provided by the authorized user of the computing device; and
    in response to determining that the voice input in the audio signal is from the authorized user of the computing device and includes the trigger phrase associated with the request to trigger device finder functionality, causing, by the one or more processors, a speaker of the computing device to audibly output an alert sound to assist the authorized user to locate the computing device.

2. The method of claim 1, wherein determining that the voice input in the audio signal is from the authorized user of the computing device and includes the trigger phrase associated with the request to trigger device finder functionality further comprises:
    comparing, by the one or more processors, a first one or more features of the voice input in the audio signal with a second one or more features of the voice sample provided by the authorized user of the computing device to determine that the voice input in the audio signal is from the authorized user of the computing device and includes the trigger phrase associated with the request to trigger device finder functionality.

3. The method of claim 1, wherein determining that the voice input in the audio signal is from the authorized user of the computing device and includes the trigger phrase associated with the request to trigger device finder functionality further comprises:
    performing, by the one or more processors, speech recognition to determine that the voice input in the audio signal includes the trigger phrase associated with the request to trigger device finder functionality; and
    in response to determining that the voice input in the audio signal includes the trigger phrase associated with the request to trigger device finder functionality, comparing, by the one or more processors, a first one or more features of the voice input with a second one or more features of the voice sample provided by the authorized user of the computing device to determine that the voice input is from the authorized user of the computing device.

4. The method of claim 1, further comprising:
    before receiving the indication of the audio signal, receiving, by the one or more processors, an indication of a second audio signal, wherein the second audio signal includes a second voice input from the authorized user, wherein the second voice input includes a phrase spoken by the authorized user;
    determining, by the one or more processors, the phrase as the trigger phrase associated with the request to trigger device finder functionality; and
    storing, by the one or more processors, the second voice input as a voice sample in memory of the computing device.

5. The method of claim 1, further comprising:
    before receiving the indication of the audio signal, receiving, by the one or more processors, an indication of a selection by the authorized user of the alert sound out of a plurality of alert sounds.

6. The method of claim 1, wherein causing the speaker of the computing device to audibly output the alert sound further comprises:
   determining, by the one or more processors, whether the computing device is located at a home location associated with the computing device;
   determining, by the one or more processors, a volume at which the speaker audibly outputs the alert sound based at least in part on whether the computing device is located at the home location associated with the computing device; and
   causing, by the one or more processors, the speaker to audibly output the alert sound at the determined volume.

7. The method of claim 1, wherein causing the speaker of the computing device to audibly output the alert sound further comprises:
   determining, by the one or more processors using one or more sensors of the computing device, that the computing device is at least partially covered by an object;
   in response to determining that the computing device is at least partially covered by the object, increasing, by the one or more processors, a volume at which the speaker audibly outputs the alert sound based at least in part on the location of the computing device; and
   causing, by the one or more processors, the speaker to audibly output the alert sound at the increased volume.

8. The method of claim 1, wherein causing the speaker of the computing device to audibly output the alert sound further comprises:
   determining, by the one or more processors, an input volume of the voice input;
   determining, by the one or more processors, a volume at which the speaker audibly outputs the alert sound based at least in part on the input volume of the voice input; and
   causing, by the one or more processors, the speaker to audibly output the alert sound at the determined volume.

9. The method of claim 1, further comprising:
   receiving, by the one or more processors, an indication of a second audio signal, wherein the second audio signal includes a second voice input;
   performing, by the one or more processors, speech recognition to determine that the second voice input in the second audio signal includes a trigger phrase associated with a request to trigger device finder functionality;
   in response to determining that the second voice input in the second audio signal includes the trigger phrase associated with the request to trigger device finder functionality, determining, by the one or more processors, that the second voice input is not from the authorized user of the computing device; and
   in response to determining that the second voice input is not from the authorized user of the computing device, outputting, by the one or more processors, a notification to notify the authorized user that the trigger phrase associated with the request to trigger device finder functionality was spoken by a user that is not the authorized user of the computing device.

10. The method of claim 1, wherein the network is a cellular network.

11. The method of claim 1, wherein the network is a Bluetooth network.

12. A computing device comprising:
   a memory configured to store a voice sample provided by an authorized user of the computing device;
   a speaker; and processing circuitry configured to:
   receive, from an external computing device, and via a network, an indication of an audio signal that includes voice input;
      determine that the voice input in the audio signal is from the authorized user of the computing device and includes a trigger phrase associated with a request to trigger device finder functionality based at least in part on comparing the voice input with the voice sample provided by the authorized user of the computing device; and
      in response to determining that the voice input in the audio signal is from the authorized user of the computing device and includes the trigger phrase associated with the request to trigger device finder functionality, cause the speaker to audibly output an alert sound to assist the authorized user to locate the computing device.

13. The computing device of claim 12, wherein to determine that the voice input in the audio signal is from the authorized user of the computing device and includes the trigger phrase associated with the request to trigger device finder functionality, the processing circuitry is further configured to:
   compare a first one or more features of the voice input in the audio signal with a second one or more features of the voice sample provided by the authorized user of the computing device to determine that the voice input in the audio signal is from the authorized user of the computing device and includes the trigger phrase associated with the request to trigger device finder functionality.

14. The computing device of claim 12, wherein to determine that the voice input in the audio signal is from the authorized user of the computing device and includes the trigger phrase associated with the request to trigger device finder functionality, the processing circuitry is further configured to:
   perform speech recognition to determine that the voice input in the audio signal includes the trigger phrase associated with the request to trigger device finder functionality; and
   in response to determining that the voice input in the audio signal includes the trigger phrase associated with the request to trigger device finder functionality, compare a first one or more features of the voice input with a second one or more features of the voice sample provided by the authorized user of the computing device to determine that the voice input is from the authorized user of the computing device.

15. The computing device of claim 12, wherein the processing circuitry is further configured to:
   before receiving the indication of the audio signal, receive an indication of a second audio signal, wherein the second audio signal includes a second voice input from the authorized user, wherein the second voice input includes a phrase spoken by the authorized user;
   determine the phrase as the trigger phrase associated with the request to trigger device finder functionality; and
   store the second voice input as a voice sample in the memory of the computing device.

16. The computing device of claim 12, wherein the processing circuitry is further configured to:

before receiving the indication of the audio signal, receive an indication of a selection by the authorized user of the alert sound out of a plurality of alert sounds.

17. The computing device of claim 12, wherein to cause the speaker of the computing device to audibly output the alert sound, the processing circuitry is further configured to:
   determine whether the computing device is located at a home location associated with the computing device;
   determine a volume at which the speaker audibly outputs the alert sound based at least in part on whether the computing device is located at the home location associated with the computing device; and
   cause the speaker to audibly output the alert sound at the determined volume.

18. The computing device of claim 12, wherein to cause the speaker of the computing device to audibly output the alert sound, the processing circuitry is further configured to:
   determine, using one or more sensors of the computing device, that the computing device is at least partially covered by an object;
   in response to determining that the computing device is at least partially covered by the object, increase a volume at which the speaker audibly outputs the alert sound based at least in part on the location of the computing device; and
   cause the speaker to audibly output the alert sound at the increased volume.

19. The computing device of claim 12, wherein to cause the speaker of the computing device to audibly output the alert sound, the processing circuitry is further configured to:
   determine an input volume of the voice input;
   determine a volume at which the speaker audibly outputs the alert sound based at least in part on the input volume of the voice input; and
   cause the speaker to audibly output the alert sound at the determined volume.

20. The computing device of claim 12, wherein the processing circuitry is further configured to:
   receive an indication of a second audio signal, wherein the second audio signal includes a second voice input;
   perform speech recognition to determine that the second voice input in the second audio signal includes a trigger phrase associated with a request to trigger device finder functionality;
   in response to determining that the second voice input in the second audio signal includes the trigger phrase associated with the request to trigger device finder functionality, determine that the second voice input is not from the authorized user of the computing device; and
   in response to determining that the second voice input is not from the authorized user of the computing device, output a notification to notify the authorized user that the trigger phrase associated with the request to trigger device finder functionality was spoken by a user that is not the authorized user of the computing device.

21. The computing device of claim 12, wherein the network is a cellular network.

22. The computing device of claim 12, wherein the network is a Bluetooth network.

23. A non-transitory computer-readable storage medium having instructions stored thereon that, when executed, cause one or more processors of a computing device to:
   receive, from an external computing device, and via a network, an indication of an audio signal that includes voice input;
   determine that the voice input in the audio signal is from an authorized user of the computing device and includes a trigger phrase associated with a request to trigger device finder functionality based at least in part on comparing the voice input with a voice sample provided by the authorized user of the computing device; and
   in response to determining that the voice input in the audio signal is from the authorized user of the computing device and includes the trigger phrase associated with the request to trigger device finder functionality, cause a speaker of the computing device to audibly output an alert sound to assist the authorized user to locate the computing device.

24. The non-transitory computer-readable storage medium of claim 23, wherein the instructions that cause the one or more processors of the computing device to determine that the voice input in the audio signal is from the authorized user of the computing device and includes the trigger phrase associated with the request to trigger device finder functionality further cause the one or more processors to:
   compare a first one or more features of the voice input in the audio signal with a second one or more features of the voice sample provided by the authorized user of the computing device to determine that the voice input in the audio signal is from the authorized user of the computing device and includes the trigger phrase associated with the request to trigger device finder functionality.

25. The non-transitory computer-readable storage medium of claim 23, wherein the instructions that cause the one or more processors of the computing device to determine that the voice input in the audio signal is from the authorized user of the computing device and includes the trigger phrase associated with the request to trigger device finder functionality further cause the one or more processors to:
   perform speech recognition to determine that the voice input in the audio signal includes the trigger phrase associated with the request to trigger device finder functionality; and
   in response to determining that the voice input in the audio signal includes the trigger phrase associated with the request to trigger device finder functionality, compare a first one or more features of the voice input with a second one or more features of the voice sample provided by the authorized user of the computing device to determine that the voice input is from the authorized user of the computing device.

26. The non-transitory computer-readable storage medium of claim 23, wherein the instructions further cause the one or more processors of the computing device to:
   before receiving the indication of the audio signal, receive an indication of a second audio signal, wherein the second audio signal includes a second voice input from the authorized user, wherein the second voice input includes a phrase spoken by the authorized user,
   determine the phrase as the trigger phrase associated with the request to trigger device finder functionality; and
   store the second voice input as a voice sample in memory of the computing device.

27. The non-transitory computer-readable storage medium of claim 23, wherein the instructions further cause the one or more processors of the computing device to:

before receiving the indication of the audio signal, receive an indication of a selection by the authorized user of the alert sound out of a plurality of alert sounds.

28. The non-transitory computer-readable storage medium of claim 23, wherein the instructions that cause the one or more processors of the computing device to cause the speaker of the computing device to audibly output the alert sound further cause the one or more processors to:
determine whether the computing device is located at a home location associated with the computing device;
determine a volume at which the speaker audibly outputs the alert sound based at least in part on whether the computing device is located at the home location associated with the computing device; and
cause the speaker to audibly output the alert sound at the determined volume.

29. The non-transitory computer-readable storage medium of claim 23, wherein the instructions that cause the one or more processors of the computing device to cause the speaker of the computing device to audibly output the alert sound further cause the one or more processors to:
determine, using one or more sensors of the computing device, that the computing device is at least partially covered by an object;
in response to determining that the computing device is at least partially covered by the object, increase a volume at which the speaker audibly outputs the alert sound based at least in part on the location of the computing device; and
cause the speaker to audibly output the alert sound at the increased volume.

30. The non-transitory computer-readable storage medium of claim 23, wherein the instructions that cause the one or more processors to cause the speaker of the computing device to audibly output the alert sound further cause the one or more processors to:
determine an input volume of the voice input;
determine a volume at which the speaker audibly outputs the alert sound based at least in part on the input volume of the voice input; and
cause the speaker to audibly output the alert sound at the determined volume.

31. The non-transitory computer-readable storage medium of claim 23, wherein the one or more processors are further configured to:
receive an indication of a second audio signal, wherein the second audio signal includes a second voice input;
perform speech recognition to determine that the second voice input in the second audio signal includes a trigger phrase associated with a request to trigger device finder functionality; and
in response to determining that the second voice input in the second audio signal includes the trigger phrase associated with the request to trigger device finder.

32. The non-transitory computer-readable storage medium of claim 23, wherein the network is a cellular network.

33. The non-transitory computer-readable storage medium of claim 23, wherein the network is a Bluetooth network.

34. A computing device comprising:
means for receiving, from an external computing device, and via a network, an indication of an audio signal that includes voice input;
means for determining that the voice input in the audio signal is from an authorized user of the computing device and includes a trigger phrase associated with a request to trigger device finder functionality based at least in part on comparing the voice input with a voice sample provided by the authorized user of the computing device; and
means for, in response to determining that the voice input in the audio signal is from the authorized user of the computing device and includes the trigger phrase associated with the request to trigger device finder functionality, causing a speaker of the computing device to audibly output an alert sound to assist the authorized user to locate the computing device.

35. The computing device of claim 34, wherein the means for determining that the voice input in the audio signal is from the authorized user of the computing device and includes the trigger phrase associated with the request to trigger device finder functionality further comprises:
means for comparing a first one or more features of the voice input in the audio signal with a second one or more features of the voice sample provided by the authorized user of the computing device to determine that the voice input in the audio signal is from the authorized user of the computing device and includes the trigger phrase associated with the request to trigger device finder functionality.

36. The computing device of claim 34, wherein the means for determining that the voice input in the audio signal is from the authorized user of the computing device and includes the trigger phrase associated with the request to trigger device finder functionality further comprises:
means for performing speech recognition to determine that the voice input in the audio signal includes the trigger phrase associated with the request to trigger device finder functionality; and
means for in response to determining that the voice input in the audio signal includes the trigger phrase associated with the request to trigger device finder functionality, comparing a first one or more features of the voice input with a second one or more features of the voice sample provided by the authorized user of the computing device to determine that the voice input is from the authorized user of the computing device.

37. The computing device of claim 34, further comprising:
means for before receiving the indication of the audio signal, receiving an indication of a second audio signal, wherein the second audio signal includes a second voice input from the authorized user, wherein the second voice input includes a phrase spoken by the authorized user; and
means for determining the phrase as the trigger phrase associated with the request to trigger device finder functionality; and
means for storing the second voice input as a voice sample in memory of the computing device.

38. The computing device of claim 34, further comprising:
means for before receiving the indication of the audio signal, receiving an indication of a selection by the authorized user of the alert sound out of a plurality of alert sounds.

39. The computing device of claim 34, wherein the means for causing the speaker of the computing device to audibly output the alert sound further comprises:
means for determining whether the computing device is located at a home location associated with the computing device;

means for determining a volume at which the speaker audibly outputs the alert sound based at least in part on whether the computing device is located at the home location associated with the computing device; and means for causing the speaker to audibly output the alert sound at the determined volume.

40. The computing device of claim 34, wherein the means for causing the speaker of the computing device to audibly output the alert sound further comprises:

means for determining, using one or more sensors of the computing device, that the computing device is at least partially covered by an object;

means for in response to determining that the computing device is at least partially covered by the object, increasing a volume at which the speaker audibly outputs the alert sound based at least in part on the location of the computing device; and means for causing the speaker to audibly output the alert sound at the increased volume.

41. The computing device of claim 34, wherein the means for causing the speaker of the computing device to audibly output the alert sound further comprises:

means for determining an input volume of the voice input;

means for determining a volume at which the speaker audibly outputs the alert sound based at least in part on the input volume of the voice input; and means for causing the speaker to audibly output the alert sound at the determined volume.

42. The computing device of claim 34, further comprising:

means for receiving an indication of a second audio signal, wherein the second audio signal includes a second voice input;

means for performing speech recognition to determine that the second voice input in the second audio signal includes a trigger phrase associated with a request to trigger device finder functionality;

means for in response to determining that the second voice input in the second audio signal includes the trigger phrase associated with the request to trigger device finder functionality, determining that the second voice input is not from the authorized user of the computing device; and means for in response to determining that the second voice input is not from the authorized user of the computing device, outputting a notification to notify the authorized user that the trigger phrase associated with the request to trigger device finder functionality was spoken by a user that is not the authorized user of the computing device.

43. The computing device of claim 34, wherein the network is a cellular network.

44. The computing device of claim 34, wherein the network is a Bluetooth network.

* * * * *